United States Patent [19]
Cone

[11] 3,866,260
[45] Feb. 18, 1975

[54] LOW SILHOUETTE CONNECTOR FOR WINDSHIELD WIPER BLADES
[75] Inventor: Irwin C. Cone, Littleton, Colo.
[73] Assignee: The Gates Rubber Company, Denver, Colo.
[22] Filed: Oct. 17, 1973
[21] Appl. No.: 407,368

[52] U.S. Cl. ............................................ 15/250.32
[51] Int. Cl. ............................................... B60s 1/40
[58] Field of Search....... 15/250.31, 250.32, 250.33, 15/250.34, 250.35, 250.42

[56] References Cited
UNITED STATES PATENTS
3,641,614   2/1972   Newsome....................... 15/250.32

*Primary Examiner*—Peter Feldman
*Attorney, Agent, or Firm*—Curtis H. Castlement, Jr.; Raymond Fink; H. W. Oberg, Jr.

[57] ABSTRACT

A connector assembly for attaching a windshield wiper arm or its extension to the superstructure of a blade is described. A transverse opening is provided in a central molded plastic yoke member of the superstructure in which is positioned a locking pin which is connected in turn to the wiper arm. The pin is retained in locking position by a substantially flat spring clip of a material having a higher modulus than the plastic of the yoke member. The clip includes at least one downturned leg engaged in slots formed in the plastic yoke body, a downward protruding tongue positioned in the opening of the yoke member normally securely engaging the pin connector. A portion of the clip spaced away from the tongue and the downturned legs is resiliently movable away from the upper surface of the yoke member to permit disengagement of the pin connector.

8 Claims, 8 Drawing Figures

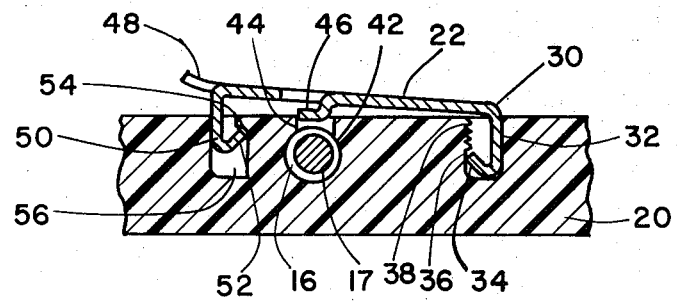
FIG. 5
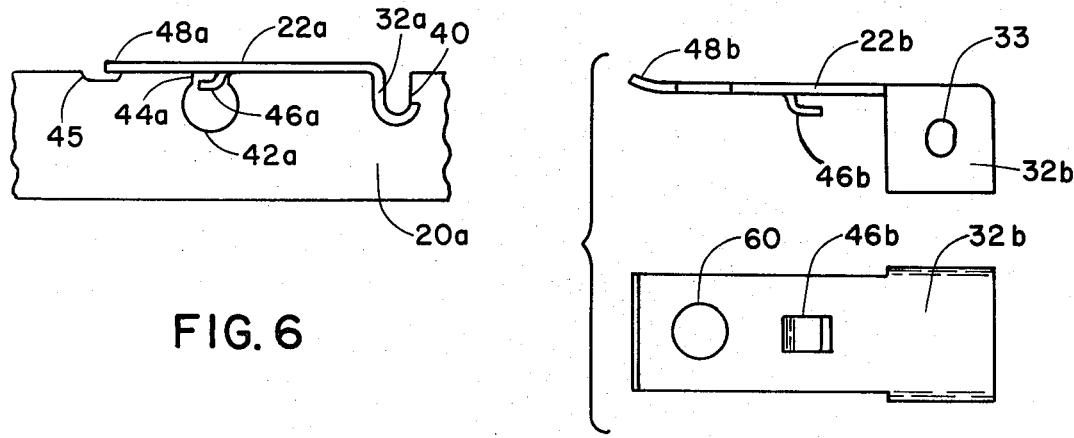
FIG. 6
FIG. 7
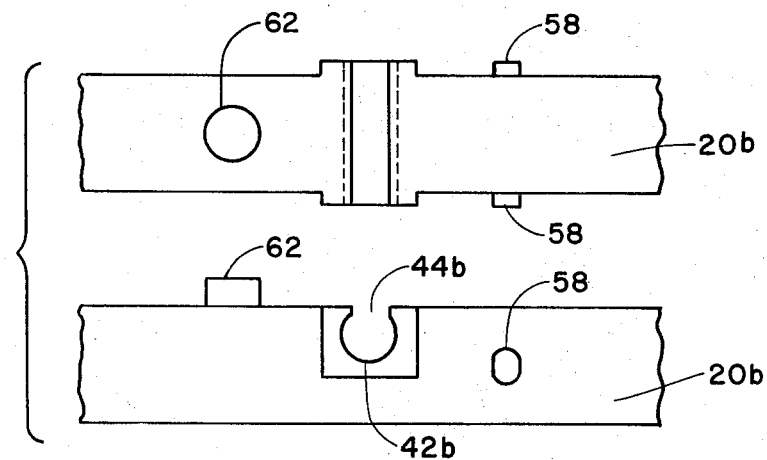
FIG. 8

LOW SILHOUETTE CONNECTOR FOR WINDSHIELD WIPER BLADES

BACKGROUND OF THE INVENTION

This invention relates to windshield wiper blades and in particular to means for connecting yoke members of a pressure-distributing superstructure at least partially made of a plastic material to a wiper arm or extension thereof.

With the advent in the use of recesses in the cowl of automobiles to hide the windshield wipers from view when in the parked position, it has become popular to employ side pin connectors to reduce the overall height of the wiper blade. Various metal-to-metal side pin configurations have been proposed, such as those described in Deibel et al. U.S. Pat. No. 3,418,678 and Schlesinger U.S. Pat. No. 3,588,941. In Hayhurst et al. U.S. Pat. No. 3,750,227 a connector is shown suitable for connecting a metal pin in an aperture formed in a plastic yoke member. The clip assembly employs a U-shaped wire which is retained in a slot of the wiper body, the wire having a curved end which normally engages a retaining slot in the wiper arm pivot pin contained within the aperture formed in the yoke member. These wire retention members have been found to be generally satisfactory, although field testing has unveiled certain annoying drawbacks, usually traced to the ease with which the wire may be permanently bent. Moreover, customarily the groove in the wiper arm pivot pin is considerably wider than the gauge of the wire producing either a resulting slop in the connection which leads to abrasion and eventual failure, or producing the constraint that the wiper arm pivot pin can be engaged from only one side of the hole in the wiper body by virtue of the positioning of the wire at one edge of the groove in the pin. It also has been found that engagement and disengagement of the connection is often accompanied by manual displacement of the end of the wire beyond its yield point or elastic limit, preventing re-engagement of the pin and wire clip.

The invention has as its primary object to overcome drawbacks of prior art side pin connector assemblies by providing a reliable spring clip producing a low silhouette connection.

SUMMARY OF THE INVENTION

Briefly described, the connector assembly includes a central molded plastic yoke member having a substantially flat top surface and having a transverse opening therethrough which extends to the top surface of the blade. The yoke member also includes slots or embossments or the like spaced from the opening for fixedly engaging downturned legs of a substantially flat spring clip which is substantially flat, made of a material having a higher modulus than the plastic of the yoke member. The clip further includes a lever portion spaced from the downturned legs which is movable away from the upper surface of the yoke member, and a tongue or the like intermediate the downturned legs and lever portion which protrudes downwardly into the opening of the yoke member for normal engagement with a grooved pin connector inserted therein. Upon displacement of the lever portion of the clip a predetermined distance away from the upper surface of the yoke member, the tongue releasably disengages the pin permitting disconnection of the blade from a wiper arm.

BRIEF DESCRIPTION OF THE DRAWINGS

By way of illustration and not by limitation certain preferred embodiments of the invention will be described in reference to the accompanying drawings, in which:

FIG. 5 depicts a view similar to FIG. 4 showing the spring clip disengaged from the side pin;

FIG. 6 is a fragmentary view of an alternative spring clip engaged in a wiper blade;

FIG. 7 depicts side and top views, respectively, of an alternative clip member; and FIG. 8 shows top and side views of a portion of a plastic yoke member which receives the clip of FIG. 7.

PREFERRED EMBODIMENTS OF THE INVENTION

Figure 1:
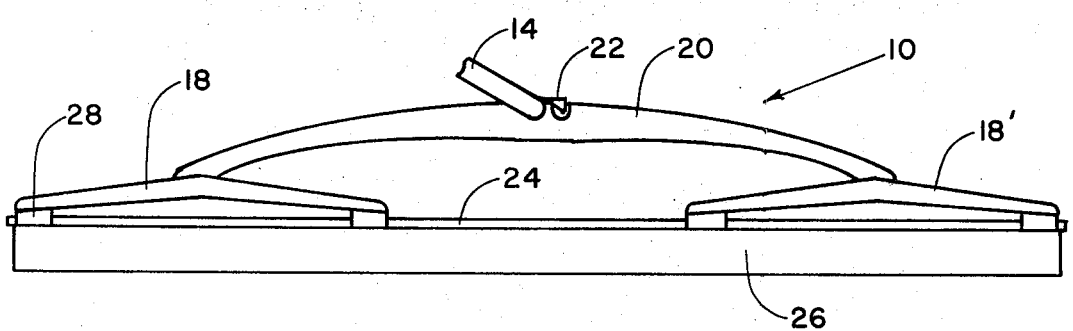
FIG. 1 is a side elevational view of a wiper blade connected to a wiper arm through a side pin connection.
Figure 2:
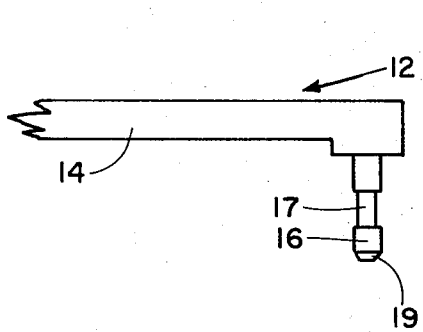
FIG. 2 is a fragmentary view of a wiper arm portion having a grooved pin connected thereto.

Referring to the drawings, a wiper assembly which may be used in conjunction with the windshield of an automobile, for instance, is generally designated at 10. An actuator arm (not shown) has its free end engageable with side arm connector 12 consisting of arm 14 to which is attached integral grooved pin 16. The pin forms a pivotal connection between the wiper actuator arm and wiper blade assembly. In general, the wiper consists of a pressure-distributing superstructure which may be of various configurations, exemplified by a pair of secondary yokes 18, 18' connected intermediate their respective ends to a primary yoke member 20 to which is engaged the substantially flat spring clip 22 of the subject invention. The wiper assembly is completed by a blade sub-assembly or refill comprised of a squeegee support backing strip 24 and an elastomeric wiping element or squeegee 26 held by the backing strip.

Each secondary yoke 18, 18' may contain two pairs of transversely aligned or staggered claws 28 which slidably connect the superstructure to the blade sub-assembly maintaining it in operative association. Abutment means (not shown) may be connected to or formed in the backing member to prevent disengagement of the superstructure from the backing strip.

Figure 3:
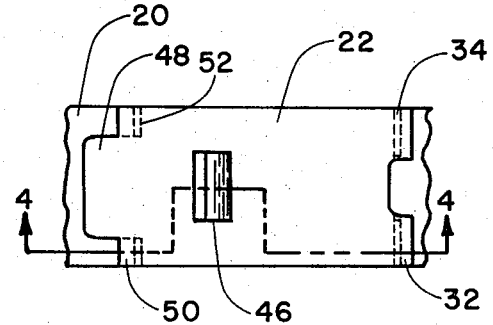
FIG. 3 is a fragmentary top view of the spring clip member engaged in the central molded plastic yoke member of the subject invention.
Figure 4:
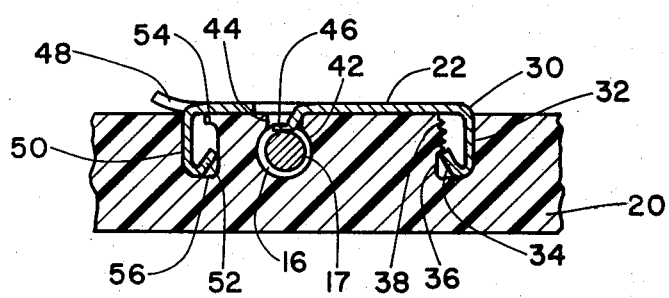
FIG. 4 is a sectional view taken along section 4—4 of FIG. 3.

According to one embodiment of the invention illustrated in FIGS. 3–5, a substantially flat spring metal clip 22 is intimately engaged in operative position in the molded plastic yoke member 20. In general, the clip will be constructed of a material having a greater modulus than the plastic utilized in the yoke member to prevent easy displacement of the pin member 16 and to permit the use of a thin stock to be compatible with the low silhouette design of the blade. Various plastic materials may be used for the primary yoke member, including polycarbonate, nylon and acetals, for instance. The advantages derived from constructing blades of plastic are known.

A first end portion 30 of the clip 22 carries a pair of downturned retention members, in this case a pair of transversely spaced, juxtaposed generally U-shaped legs 32 whose upturned ends 34 fixedly engage the sides of slot 36 formed in the yoke member 20. For this purpose, saw teeth 38 facilitate engagement of end 34 at the correct depth in the slots 36. Various other abutment means such as shoulder 40 of FIG. 6 serve the desired purpose of fixedly retaining the leg in the slot.

Opening 42 in the yoke member contains a free passageway 44 of lesser dimension than hole 42. In the normal engagement position of the clip and pin assembly, downward protruding means such as tongue 46 engages the slot 17 of the grooved pin 16 for secure engagement therebetween while permitting pivotal movement of the pin. Means other than a downwardly protruding tongue will serve this purpose, exemplified by an embossment or the like. In any event, the downwardly protruding member should have greater transverse width than thickness, the width preferably being substantially the same as the width of the groove of the pin to prevent significant relative displacement between the wiper arm and blade assembly.

The opposite end of the clip member 22 includes a lever portion 48 movable away from the upper surface of the yoke member for disengagement of the tongue 46 from the grooved pin connector 16. In a preferred form of the invention, there is additionally provided stop means for limiting the movement of the free end 50 of the clip up to a predetermined distance which does not exceed the elastic limit of yield point of the material used for the spring clip. In FIG. 4 this stop means includes a pair of shoulders 54 formed in slots in the yoke member 20 which prevent withdrawal of ears 52 from the slots. In this manner, the spring member cannot be inadvertently bent beyond its spring recovery point, as has often occured with the prior art wire clip member.

The disengagement position between the wiper blade and side pin connection is shown in FIG. 5. The distance between ends of ears 52 and 54 is so selected that displacement of end 48 upwardly will cause tongue 46 to displace vertically sufficiently to free the pin.

Referring now to FIG. 6, an alternative clip 22a and wiper blade assembly is shown in which the retention portion of the clip 32a is forced into a slot formed in the blade lever arm 20, the end of the retention means abutting against shoulder 40 in secured relationship. The downwardly extending tongue 46a may be displaced upwardly by manually lifting end 48a upwardly from notch 45.

In FIGS. 7 and 8, the clip member 22b includes a pair of downwardly projecting side flanges 32b each having noncircular holes 33 therein which engage corresponding embossments 58 formed on the sides of the lever member 20b. The clip is precluded from undergoing sideways movement with respect to the blade by engagement within bore 60 of cylindrical embossment 62. Upward displacement of the end of the clip at fingerhold 48b lifts tongue 46b into passageway 44b above aperture 42b, permitting disengagement of the side pin from the blade.

In any of the embodiments, to attach the wiper blade to a side pin emanating from a wiper arm, the pin on the arm is inserted in the opening through the blade until the tongue of the clip snaps into the recess in the middle of the pin. This operation is facilitated by the reaction of the beveled surface 19 of the pin. Alternatively the pin can be unbeveled in which case it is necessary to manually lift lever 48 to insert pin in the connector.

It will be noted that in all of the embodiments shown, the flat spring clip has sufficient resiliency so that the retention end portion of the clip, and/or the stop means portion of the clip may be snapped into the corresponding slots or formed over the corresponding embossments of the plastic yoke member to effectuate secure engagement of those parts. In a preferred embodiment, the entire clip may be formed from a single stamped piece of sheet metal, so that only a single part is employed, with an attendant reduction in noise compared with that normally generated from a plurality of associated parts.

It will also be noted that the clip member of the subject invention may suitably retain a pin associated with a connector of a different type. Thus, the clip may be used in conjunction with a grooved pin in a bayonet-type connection.

It will be understood that the invention is capable of a variety of modifications and variations which will be made apparent to those skilled in the art by a reading of this specification and which are to be included within the spirit and scope of the invention as determined by the claims appended hereto.

What is claimed is:

1. In a windshield wiper assembly having an elastomeric squeegee wiping element, a squeegee-retaining backing member and a pressure-distributing superstructure engaging the backing member, said superstructure including a central molded plastic yoke member having a substantially flat top surface and a transverse opening therein releasably engageable with a wiper arm by a pin and clip assembly, the improvement comprising in combination therewith:

a substantially flat spring clip of a material having a modulus greater than the plastic of the yoke member, said clip attached to and closely engaging the top of the central yoke member forming a low silhouette connection therewith, the clip comprising:

a downturned retention portion securely and fixedly engaged in a receiving portion formed in the surface of the yoke member;

a lever portion spaced from the retention portion resiliently movable away from the upper surface of the yoke member while said retention portion remains fixed; and means intermediate said retention and lever portions of the clip protruding downwardly through a passageway into the opening in the yoke member for normal engagement with the pin, disengageable therewith upon displacement of said lever portion of the clip a predetermined distance away from the upper surface of the yoke member.

2. The windshield wiper assembly of claim 1 wherein there is additionally provided stop means located on the lever portion side of said opening for limiting the movement of said lever portion of the clip short of its elastic limit.

3. The windshield wiper assembly of claim 2 wherein said stop means includes a pair of generally U-shaped downturned legs contained within slots formed in the yoke member, at least one of said slots having an abutment against which the ends of the U-shaped legs are limitingly movable.

4. The windshield wiper assembly of claim 1 wherein said retention portion of the clip includes a pair of transversely spaced, juxtaposed generally U-shaped legs engaged in separate cooperating slots of the yoke member.

5. The windshield wiper assembly of claim 1 wherein the retention and lever clip portions and the intermediate pin engaging means are formed from a single stamped metal part.

6. The windshield wiper assembly of claim 1 wherein the retention portion of the clip comprises a pair of downwardly projecting side flanges each having holes therein lockingly engageable with cooperating bosses formed on the sides of the yoke member so as to preclude substantial pivotal movement of the flange about said bosses.

7. The windshield wiper of claim 1 wherein said intermediate means consists of a metal tongue integral with the clip and having greater transverse width than thickness.

8. The windshield wiper of claim 7 wherein said pin carries a groove engageable with the metal tongue, the width of the groove being substantially the same as the transverse width of the tongue.

* * * * *